May 26, 1931.  E. TETRAULT  1,806,723
UNIVERSAL JOINT
Filed May 3, 1930
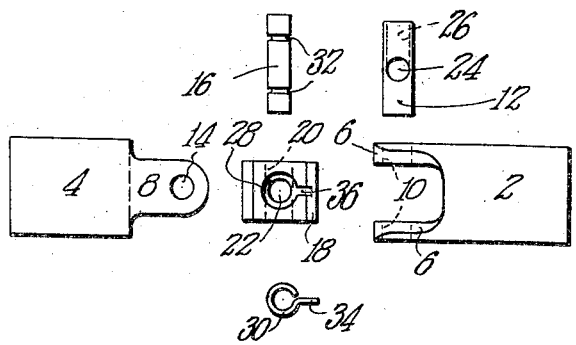
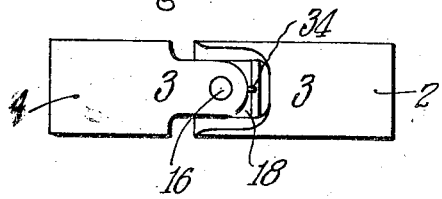
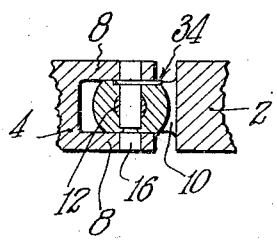
INVENTOR.
Eusebe Tetrault
BY
his ATTORNEY.

Patented May 26, 1931

1,806,723

UNITED STATES PATENT OFFICE

EUSEBE TETRAULT, OF LUDLOW, MASSACHUSETTS

UNIVERSAL JOINT

Application filed May 3, 1930. Serial No. 449,443.

This invention relates to improvements in universal joints and is directed particularly to joints of the type wherein forked members are pivotally connected to the common central block.

The principal object of the invention is the provision of a universal joint having a novel combination and arrangement of parts which includes means to facilitate the ready assembling thereof.

According to a special feature of the invention, means provided for retaining the parts in assembled relation have means associated therewith which is adapted to serve as a telltale, so that the absence of said holding means from the assembly will be readily obvious. This aids in the inspection of the assembly and insures the rejection of all universal joints which are incomplete in respect to important parts thereof.

The numerous novel features and advantages of the invention will be observed from the following description taken in connection with the accompanying drawings, in which:

Fig. 1 is a plan view of the parts of a universal joint in unassembled relation.

Fig. 2 is a plan view of a completely assembled universal joint embodying the novel features of the invention, and Fig. 3 is a sectional elevational view taken on the line 3—3 of Fig. 2.

Referring now to the drawings in detail the invention will be described.

Separate forked joint members 2 and 4 are provided which are formed to have a pair of lugs 6 and 8 arranged in spaced relation. The lugs of the member 2 are bored as at 10 for receiving a pivot pin 12 of one diameter and the lugs 8 of the member 4 are provided with a suitable opening 14 of a relatively smaller diameter for receiving a locking pivot pin 16. The members 2 and 4 may be bored or otherwise arranged for receiving or connecting to driving and driven elements, such as shafts.

A central connecting block 18 is provided for fitting between the lugs 6 and 8 and is bored in one direction or longitudinally as at 20 to receive the pin 12 and in an opposite or transverse direction as at 22 to receive pin 16.

The pin 12 is provided with a radial or transverse opening or bore 24 to receive the pin 16 and may have a longitudinal or axial bore 26 communicating therewith to serve as a chamber for lubricant.

In assembling the parts, the block 18 is inserted between the lug 6 of the member 2 and the pin 12 is inserted through the bores 10 of the lugs and bore 20 of the block so that the opening 24 of pin 12 registers with the transverse opening 22 of the block. The lugs 8 are then slipped over the block so that the pin 16 may be inserted in the bore 14 of the lugs 8, the bore 22 of block 18 and bore 24 of pin 12. In this way the pin 12 is held against axial displacement and block 18 is held between lugs 6. At the same time lugs 8 and the block are pivotally connected together so that the members 2 and 4 may swing relative to one another.

The pin 16, as will be observed, so long as it is properly disposed in the opening 22 will function to hold the parts together in assembled relation. In order to prevent this pin from moving axially of the assembly it is locked in the following manner:

A depression or seat 28 is provided in a side of block 18 around the bore 22 for receiving a snap ring member 30. The pin 16 is provided with a groove or grooves 32 for receiving the ring. When the parts are assembled, the ring is located in the seat 28 before the block is inserted between lugs 6. Then as pin 16 is inserted in bores 14 of lugs 8 and bore 22 of block 18, the ring snaps into a groove 32 of pin 16. The ring is held against axial movement between the seat of the block and a side of one of the lugs 6 and being seated in a groove of pin 16, the pin is held against displacement and therefore all of the parts are held in their assembled relation.

In the assembling of these parts it is possible, especially when the parts are of rather small size, that the snap ring will be omitted or in handling the parts that it will be lost, so that the parts are assembled without it and the assembly shipped and put into use without the pin 16 being retained properly in place. In fact this has occurred. When a universal joint is put into use and in which the pins are not locked the pins fall from the joint so that the parts become disconnected. In many cases this has resulted in serious consequences.

With the parts completely assembled since the ring underlies one of the lugs 6, it would be hidden from view and there is no convenient way of determining whether or not the snap ring is in place. It will be appreciated that the pins and the bores which receive them are fitted snug, as it is called, so that the absence of the ring is not readily noticeable as the pin 16 is inserted in the block.

According to one important feature of the invention, I provide means in association with the snap ring and block which functions as a telltale so that from an examination of the assembled parts it may be readily determined whether the ring is in place.

To accomplish this an extension 34 is provided which projects radially from the ring 30 and a groove 36 is provided in a side of the block 18 which extends outwardly from the seat 28. When the ring 30 is in place in the seat provided therefor the extension 34, which may be called the telltale, is disposed in the groove 36.

With the parts in assembled relation as shown in Fig. 2, the "telltale" projects beyond the end of lug 8 so as to be clearly visible. The presence or absence of the telltale can be relied upon to indicate whether or not the pin 16 is properly locked in place by a snap ring.

The telltale makes it possible to readily inspect assembled universal joints for the important locking unit whereby it is possible to ship and put into use only such universal joints as have the pins thereof properly locked in place.

What I desire to claim and secure by Letters Patent of the United States is:

1. A universal joint structure comprising, a central block member, forked members having pairs of lugs at opposite sides of said block, a pivot pin for connecting one pair of lugs to said block, a pivot locking pin for connecting the other pair of lugs to said block and for holding the pivot pin against movement, a locking member associated with said pivot locking pin and block which is provided with a telltale portion extending outwardly from one of said lugs whereby the presence of the locking member may be determined.

2. A universal joint structure comprising, a central block member, forked members having pairs of lugs at opposite sides of said block, a pivot pin for connecting one pair of lugs to said block, a pivot locking pin for connecting the other pair of lugs to said block and for holding the pivot pin against movement, a snap ring engaging said pivot locking pin disposed between said block and an adjacent side of a lug having a telltale extension which extends beyond a marginal edge of said lug so as to be visible to indicate the presence of said ring in said structure.

3. A universal joint structure comprising, a central block member, forked members having pairs of lugs at opposite sides of said block, a pivot pin for connecting one pair of lugs to said block, a pivot locking pin for connecting the other pair of lugs to said block and for holding the pivot pin against movement, a snap ring engaging said pivot locking pin disposed between said block and an adjacent side of a lug having a telltale extension which extends beyond a marginal edge of said lug so as to be visible to indicate the presence of said ring in said structure, the said block being provided with a groove in which the telltale extension is receivable whereby it is held against swinging movements from its indicating position.

In testimony whereof I affix my signature.

EUSEBE TETRAULT.